United States Patent [19]

Lacour

[11] Patent Number: 4,860,810
[45] Date of Patent: * Aug. 29, 1989

[54] PNEUMATIC TIRE HAVING BEAD RING WITH SAWTOOTH RIDGES

[75] Inventor: Jean-Charles Lacour, Clermont-Ferrand, France

[73] Assignee: Compagnie Generale des Etablissements Michelin, Clermont-Ferrand Cedex, France

[*] Notice: The portion of the term of this patent subsequent to Jul. 5, 2005 has been disclaimed.

[21] Appl. No.: 71,479

[22] Filed: Jul. 9, 1987

[30] Foreign Application Priority Data

Jul. 9, 1986 [FR] France .................. 86 10373

[51] Int. Cl.$^4$ .................. B29D 30/48; B29D 30/06
[52] U.S. Cl. .................. 152/540
[58] Field of Search .......... 156/136; 152/539, 540, 152/544, 545, 547, 551; 245/1.5

[56] References Cited

U.S. PATENT DOCUMENTS

| | | | |
|---|---|---|---|
| 1,562,678 | 11/1925 | Beyea | 156/136 |
| 1,763,179 | 6/1930 | Pierce | 245/1.5 |
| 1,969,438 | 8/1934 | Warden | 156/136 |
| 3,028,902 | 4/1962 | Formanek | 152/547 |
| 3,237,674 | 3/1966 | Budd et al. | 152/540 |
| 3,372,894 | 3/1968 | Pearce | 152/547 |
| 3,612,139 | 10/1971 | Marzocchi et al. | 152/540 |
| 4,320,791 | 3/1982 | Fujii et al. | 152/540 |
| 4,561,919 | 12/1985 | Forsyth | 156/136 |
| 4,711,285 | 12/1987 | Ogawa et al. | 152/458 |
| 4,754,794 | 7/1988 | Bocquet et al. | 245/1.5 |

FOREIGN PATENT DOCUMENTS

| | | |
|---|---|---|
| 1918224 | 7/1970 | Fed. Rep. of Germany . |
| 1380138 | of 1964 | France . |
| 1448380 | of 1966 | France . |
| 2103110 | 4/1972 | France . |
| 2234126 | 1/1975 | France . |
| 2576247 | 7/1986 | France . |
| 214472 | 4/1924 | United Kingdom ........ 245/1.5 |
| 1059821 | 2/1967 | United Kingdom . |
| 1346997 | 2/1974 | United Kingdom . |

*Primary Examiner*—Willard Hoag
*Attorney, Agent, or Firm*—Brumbaugh, Graves, Donohue & Raymond

[57] ABSTRACT

A bead ring for reinforcing a bead of a pneumatic tire having a carcass ply comprises, on the bead ring surface, ribs made of a material whose secant modulus in extension, measured at 10% elongation and at 160°0 C., is equal to at least 70 MPa. Pneumatic tires have such a bead ring, the carcass ply being in contact with the ribs.

10 Claims, 4 Drawing Sheets

PNEUMATIC TIRE HAVING BEAD RING WITH SAWTOOTH RIDGES

BACKGROUND OF THE INVENTION

The present invention relates to pneumatic tires and more particularly to bead rings for reinforcing the beads of such tires.

When the beads become warm as a result in particular of an accidental heating of the rim, for instance, due to a locking of the brakes, a change takes place in the rubber which surrounds the bead rings in such a way that the carcass ply or plies which surround the bead rings are no longer retained by the latter. As a result of the inflation pressure, a relative sliding of these carcass plies in the bead with respect to the bead rings then takes place, which causes deformation and deterioration of the beads. This phenomenon manifests itself in particular in the case of rigid bead rings.

SUMMARY OF THE INVENTION

The object of the present invention is to overcome these drawbacks. Therefore, the bead ring of the invention for reinforcing a bead of a pneumatic tire having at least one carcass ply comprises, on the bead ring surface, ribs made of a material whose secant modulus in extension, measured at 10% elongation and at 1160° C., is equal to at least 70 MPa, these ribs coming into contact with the carcass ply in the tire, either directly or via a thin layer of rubber.

The invention also relates to a method for the manufacture of a bead ring, which comprises producing, on the bead ring surface, ribs made of a material whose secant modulus in extension, measured at 10% elongation and at 160° C., is equal to at least 70 MPa.

The invention also relates to the bead ring obtained by this method.

The invention also relates to a pneumatic tire having at least one carcass ply and at least one bead reinforced wtih at least one bear ring according to the invention and/or made by the method according to the invention, the carcass ply being in contact with the ribs, either directly or via a thin layer of rubber.

The invention will be easily understood from the non-limitative examples which follow and the schematic figures illustrating these examples.

DETAILED DESCRIPTION OF THE INVENTION

Figure 1:
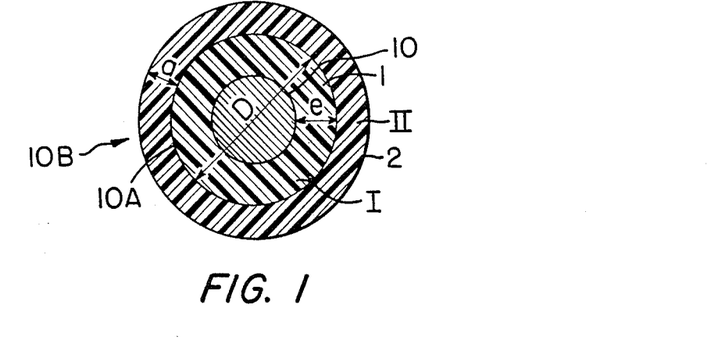
FIG. 1 is a sectional view through a reinforcement wire surrounded by a sheath of organic material I and a sheath of organic material II.
Figure 2:
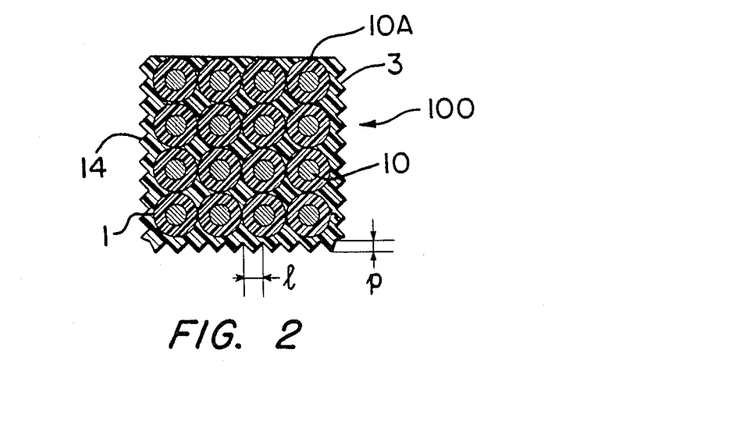
FIG. 2 is a section through a bead ring according to the invention made with the wire shown in FIG. 1.

FIG. 1 shows a reinforcement wire 10 used to produce the bead ring 100 of the invention which is shown in FIG. 2, FIGS. 1 and 2 being sections taken perpendicular to the axis of the wires 10 which are arranged parallel to each other in the bead ring 100.

This wire 10 is surrounded by a sheath 1 formed of an organic material I, this sheath 1 of thickness "e" being in direct contact with the wire 10, and by a sheath 2 of organic material II, this sheath 2 of thickness "a" being in direct contact with the sheath 1. The organic materials I and II are, for instance, thermoplastic materials such that the melting point of organic material I is greater than the melting point of organic material II.

For clarity in description, several numbers and designations are used with respect to the wire 10, as follows:

the wire itself bears the reference number 10;

the combination of the wire 10 and its solid sheath 1 is called the "sheathed wire 10A";

the combination of the wire 10 and its solid sheaths 1, 2 is called the 'sheathed wire 10B' (FIG. 1);

the combination of the wire 10, its solid sheath 1 and a sheath of liquid or pasty material II, for instance after the melting of the sheath 2, is called the "sheathed wire 10C."

The sheaths 1 and 2 are produced, for instance, by means of two successive extrusions around the wire 10, the first extrusion producing the sheath 1 and therefore the sheathed wire 10A and the second extrusion producing the sheath 2 and therefore the sheathed wire 10B when the sheath 2 is solid, the material of the wire 10 remaining solid when the materials I or II are in molten state.

These two extrusions can be produced discontinuously, for instance, with two separate machines, or continuously, in particular with a single machine having an extrusion head with two separate feeds for the materials I and II. In all cases, the extrusion of the sheath 2 over the sheath 1 must be effected when material I is solid, that is to say the sheath 2 must be extruded over the sheathed wire 10A.

The bead ring 100 comprises a plurality of wires 10A, that is to say several wires 10 each individually surrounded by a sheath 1, and a matrix 3 within which the sheathed wires 10A are arranged. This matrix 3 is formed of the material II of the previously described sheaths 2.

Figure 3:
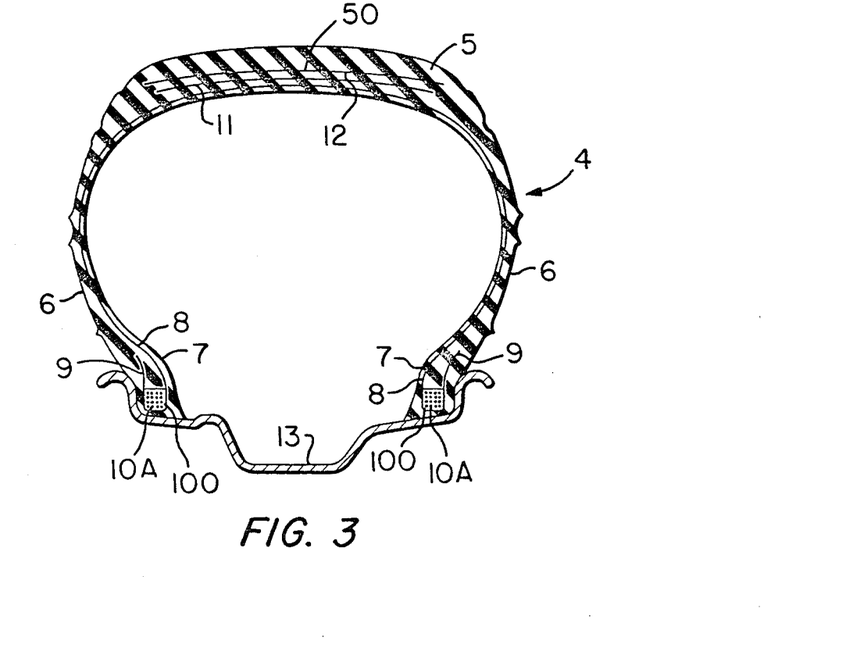
FIG. 3 shows, in radial section, a pneumatic tire having two bead rings identical to the bead ring shown in FIG. 2.

FIG. 3 is a radial section through a pneumatic tire 4. This tire 4 has a crown 5, two sidewalls 6 and two beads 7. Each bead 7 is reinforced by a bead ring 100 which is identical to the bead ring 100 shown in FIG. 2. In FIG. 3, for simplification of the drawing, each sheathed wire 10A is represented by a dot. A carcass ply 8 connects the bead rings 100, it extending around the bead rings 100 in a manner known per se, the upward turn 9 of the carcass ply 8 being, for instance, arranged towards the outside of the tire 4. The crown 5 is made rigid by the reinforcement 50, formed for instance of two plies 11 and 12. The tire 4 is mounted on its rim 13. In accordance with the invention, the bead ring 100 has ribs 14 on its surface. These ribs 14 are shown in FIG. 2 but, for purposes of simplification, not in FIG. 3. These ribs 14 are made of a material whose secant modulus in extension, measured at 10% elongation and at 160° C., is equal to at least 70 MPa, and preferably equal to at least 200 MPa, and the carcass ply 8 is in contact with these ribs 14 in the region where it extends around the bead ring 100, either directly or via a thin layer of rubber, the thickness of this layer being preferably less than 1 mm. These ribs 14 are continuous and circumferential, the axis of these ribs 14 being therefore the axis of the tire 4, that is to say the axis of revolution of the tire 4 and the rim 13, this axis not being shown in the drawing for reasons of simplification.

These ribs 14 permit a good anchoring of each bead ring 100 in the corresponding bead 7 as well as a good anchoring of the carcass ply 8 around each bead ring 100. Due to this arrangement, the carcass ply 8 is anchored to the ribs 14 and for all practical purposes does not slide with respect to the bead ring 100. When the bead ring 100 is rigid, that is to say when its radial section can turn only with difficulty, the bead ring 100 and the carcass ply 8 constitute within the bead 7 an assembly in which there is practically no relative sliding between the bead ring 100 and the carcass ply 8 despite the pressure of the air in the tire, even when the bead 7 undergoes heating, for instance as the result of an accidental heating of the rim 13 caused by a locking of the brakes, and the risk of damage to the bead 7 is therefore eliminated or considerably decreased.

Figure 4:
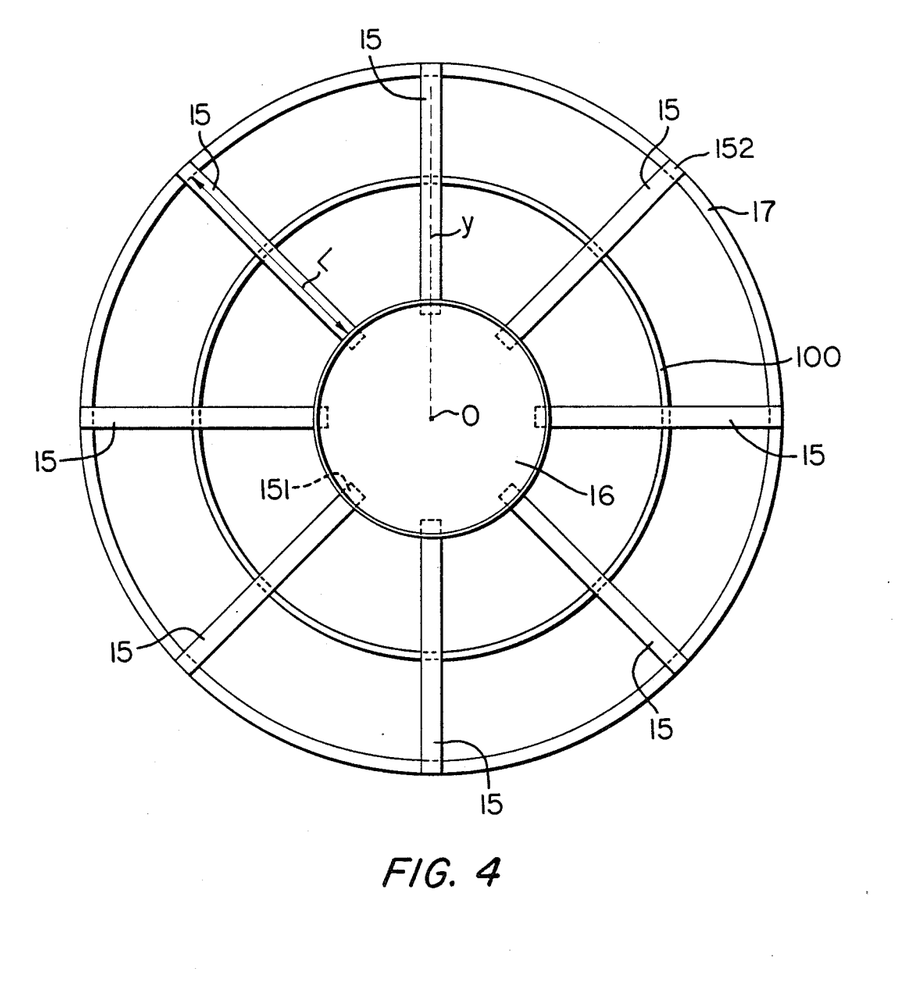
FIG. 4 shows, in top view, a device for measuring the rigidity of a bead ring.

The rigidity of the bead ring 100 is preferably such that it is necessary to apply to the bead ring 100 a torque equal to at least 0.8 daNm, at room temperature, in order to cause a rotation of 1° of the bead ring radial section. By definition, a radial section is the section of the bead ring 100 through a plane passing through the axis of the bead ring 100, and the angle of rotation is determined, in the plane of said section, by the variation of the direction of a straight line passing through two points of said section as a result of the rotation of the section due to the torque. By way of example, this torque is measured with the device shown in FIG. 4. In FIG. 4, the bead ring 100 is arranged in such a manner that its axis is vertical, this axis being represented by the letter O. The bead ring 100 is held in eight bars 15 of the same length distributed radially and uniformly, that is to say the axis of each of these bars 15 passes through the axis O and the angle formed by the axes of two consecutive bars 15 is 45°. For simplicity in the drawing, the axis Y of a single bar 15 is shown in FIG. 4. The ends 151 of the bars 15 located towards the axis O are placed beneath a circular disk 16 whose center is located on the axis O and the ends 152 of the bars 15 furthest away from the axis O are arranged on a ring 17, the bars 15 being in contact with the disk 16 and the ring 17 but without being mechanically connected to them. Initially the bead ring 100, the bars 15, the disk 16 and the ring 17 are horizontal.

A force is then applied along the axis O onto the disk 16 which is movable parallel to the axis O. This disk 16 then rests vertically on the ends 151 of the bars 15 and shifts them downward. The ring 17 is rigid and therefore it prevents the ends 152 of the bars 15 from descending. Under the effect of this axial force, the bars 15 therefore incline downward, the axis of each bar 15 remaining in a vertical plane passing through the axis O, that is to say a radial plane. The bead ring 100 is rigidly fixed in the bars 15, that is to say the bead ring radial section is subjected to torsion at the same time as the inclining of the bars 15. F is the value of the axial force which makes it possible to obtain an inclination of 1° for the bars 15, and L is the radial distance measured along an axis Y between the disk 16 and the ring 17 before the application of the force, L being therefore practically the distance between the opposite vertical forces applied to the ends 151, 152 of each bar 15.

The torque applied to the bead ring 100 is then equal to F x L and permits a rotation of 1° of the radial section of the bead ring 100. As previously stated, this torque is preferably at least equal to 0.8 daNm, this torque being measured at room temperature (about 20° C.).

The bead ring 100 is produced, for instance, in the following manner, using the device 20, shown in FIG. 5, in a manner similar to the method described in French patent application No. 85/00875 (which corresponds to U.S. application Ser. No. 817,906, filed Jan. 10, 1986). This device 20 has a bobbin 21, a heating tunnel 22 and a drum 23. The sheathed wire 10B comprising the solid sheaths 1 and 2, the materials I and II being, for instance, thermoplastic materials, is wound on the bobbin 21. This sheathed wire 10B is unwound in the direction indicated by the arrow $F_{10}$ so as to cause the sheathed wire 10B to pass through the heating tunnel 22 and wind up on the drum 23. The heating tunnel 22 permits the melting of the material II while the material I remains solid so as to obtain the sheathed wire 10C which is then wound in the gorge 24 of the drum 23.

Figure 5:
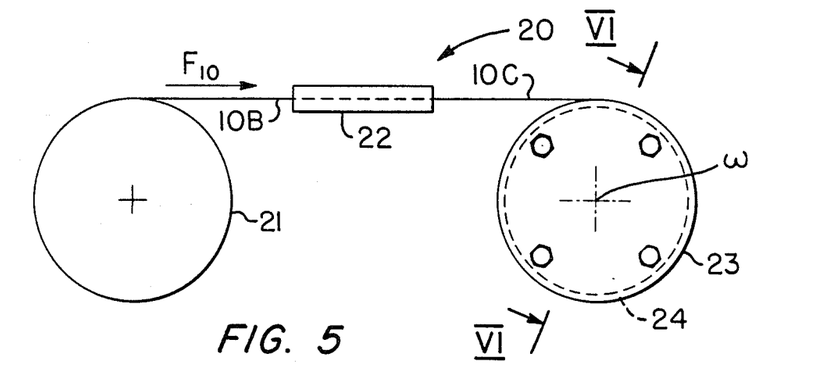
FIG. 5 shows, in side view, a device for producing the bead ring shown in FIG. 2, this device comprising a drum.
Figure 6:
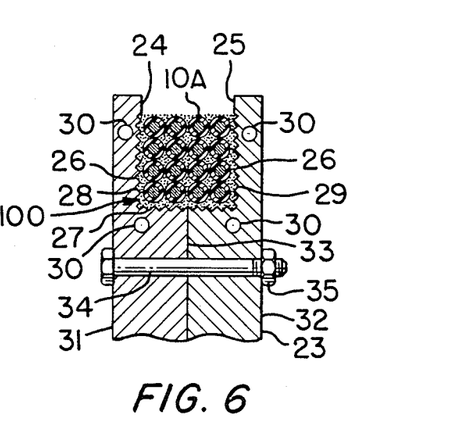
FIG. 6 is a cross section through a portion of the drum shown in FIG. 5; this cross section being taken along the section line VI—VI of FIG. 5.

FIG. 6 shows a portion of the cross section of the drum 23 through a plane passing through the axis of rotation of the drum 23, this axis being indicated schematically by the letter $\omega$ in FIG. 5, the cross section of FIG. 6 being schematically indicated by the straight line VI—I of FIG. 5. The gorge 24 has a longitudinal orientation on the drum 23, this gorge 24 having an axis of revolution which is the axis $\omega$ of the drum 23.

The wall 25 of the gorge 24 has grooves 26 which are circumferential, that is to say they have the axis $\omega$ as axis of rotation. This wall 25 comprises three faces: A bottom 27 and two side faces 28, 29. The bottom 27 has a general orientation which is that of a cylinder of revolution with axis $\omega$, and the side faces 28, 29 have a general orientation perpendicular to said axis $\omega$, the grooves 26 being distributed over these three faces 27, 28, 29.

The winding of the sheathed wire 10C takes place in the cavity formed by the gorge 24 by the superimposing of layers of turns. The pressure exerted during the winding on the assemlby of these turns by the faces 27, 28, 29 makes it possible to fill empty spaces between the sheathed wires 10A by the liquid material II, this liquid material II also filling all the empty spaces between the wall 25 and the sheathed wires 10A, the gorge 24 serving as mold upon the winding of the sheathed wire 10C due to its faces 27, 28, 29, and the material I of the sheaths I remaining solid.

The heating resistors 30 make it possible to maintain the material II at a temperature above its melting point and below the melting point of material I. When the desired number of turns has been grouped by winding in the gorge 24, the sheathed wire 10C is cut and the drum 23 allowed the cool so as to cause the solidification of the material II and thus obtain the bead ring 100.

The drum 23 is formed of two parts 31, 32 the junction plane 33 of which, perpendicular to the axis $\omega$, extends to the bottom 27. The parts 31, 32 are connected together by bolts 34 which pass through these parts, the clamping being effected by the nuts 35 arranged on the ends of the bolts 34. When the material II has solidified, the drum 23 is removed by unscrewing the nuts 35 and removing the bolts 34, which makes it possible to separate the parts 31, 32 and to remove the bead ring 100 from the gorge 24. The drum 23 can then be reassembled by connecting together the parts 31, 32 for the manufacture of another bead ring 100.

The cross sections through the bead ring 100 shown in FIGS. 2 and 6 are identical, with the difference that the sectional view of FIG. 2 is an enlargement of the sectional view of FIG. 6 and the ribs 14 of the bead ring 100 correspond to the grooves 26 of the gorge 24.

Figure 7:
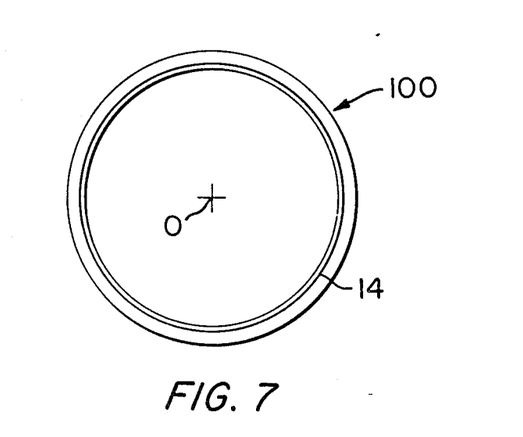
FIG. 7 shows, in profile view, the bead ring shown in FIG. 2.

FIG. 7 is a profile view of the bead ring 100; a single rib 14 is shown in this FIG. 7 for purposes of simplification, this rib 14 being a rib of revolution around the axis of the bead ring 100, this axis being represented by the point O which coincides with the axis $\omega$ of the drum 23 or with the axis of the tire 4 and of the rim 13.

The diameter of the sheathed wire 10A is represented by D in FIG. 1, and the width l (FIG. 2) of the ribs 14 and therefore of the grooves 26 is preferably less than this diameter D, so that the turns of sheathed wires 10A are arranged uniformly in the bead ring 100, without penetrating into the ribs 14. This width l is preferably less than 3 mm. The ribs 14 preferably have an angular shape, as shown in FIG. 2. Due to the method described above, the wires 10 remain separated from each other, since the solid sheaths 1 prevent any direct contact between the wires 10 during the production of the bead ring 100. The sheaths 1 of two adjacent sheathed wires 10A are in contact with each other, that is to say the distance between two adjacent wires 10 is constant and equal to 2e, the sheathed wires 10A being thus in contact with each other (FIG. 2). It is easy to select the thickness "e" of the sheath 1 in such a manner as to assure a given distance between two adjacent wires 10, and it is also easy to select the amount of material II for the sheaths 2 in such a manner that, after melting, the material II fills the empty spaces between the sheathed wires 10A, that is to say between the sheaths 1 which serve, so to speak, as wedges between the wires 10 upon the production of the bead ring 100 and that the material II fills the empty spaces between thye sheathed wires 10A and the wall 25 to form the ribs 14, this material II thus giving the matrix 3. The amount of material II is determined by the thickness "a" of the sheath 2, with due consideration of the diameter D.

Thus in a simple and economic manner one obtains a given geometrical shape for the bead ring 100 with a constant distance between the wires 10 which are without direct contact with each other due to the sheaths 1. One thus obtains uniform performance for this bead ring 100, avoiding the risks of wear of the wires 10 between each other.

The wires 10 can be made of a metallic material such as steel or a non-metallic material, for instance an inorganic material such as glass, or an organic material such as a polyester of a non-aromatic or aromatic polyamide. The invention also makes it possible to avoid corrosion if the wires 10 are metallic.

The organic materials I and II can be other than thermoplastic; thus, for example, at least one of these materials may be a hardenable material, the material II, upon the production of the bead ring 100, being in a liquid or pasty state before hardening in order to permit its migration and the hardening of the material II is then brought about, producing the solid matrix 3.

When in contact with the material II the material I must remain solid.

When the materials I and/or II are not thermoplastic, their chemical composition may vary between the time when the coating of the sheaths 1 and/or 2 is effected and the time when these sheaths 1 and/or 2 are solid. In any event, upon the production of the bead ring 100, the temperature of the material II when it is in liquid or pasty state must be such that the materials of the wire 10 and of the sheath 1 remain solid and do not undergo any substantial degradation, the material II being therefore able to solidify at a temperature at which material I and the wire 10 remain solid.

It is preferable to use two thermoplastic materials I and II, as previously described, since the method is very simple and permits rapid rates of manufacture for the production of the bead ring 100.

The materials I and/or II may each comprise several organic materials, for example a mixture of polymers, and they may comprise non-organic materials, for instance fillers and various adjuvants. It is possible furthermore to select the moduli of the wires 10 and of materials I, II so as to permit a good distribution of the stresses in the bead ring 100 upon its use. Thus the ratio between, on the one hand, the modulus of extension of each wire 10 and, on the other hand, the modulus of compression of the material I in the bead ring 100 is preferably equal to at least 1 and at most 300, and the materials I and II preferably have substantially the same modulus of compression, the moduli of extension and compression being determined at room temperature (about 20° C.). Furthermore, in order to permit a good distribution of the stresses in the bead ring 100, it is necessary that the material I adhere to the wires 10 and to the matrix 3.

By way of example, the manner of production of the bead ring 100 and its characteristics are as follows:

wires 10: wires of steel, these wires each having a modulus of extension of 20,000 daN/mm$^2$; diameter of each wires: 1 mm; number of wires in the bead ring: sixteen, these wires being distributed in four layers of four wires each (four turns per layer), the bead ring having a square cross section (FIG. 2);

sheath 1: thickness "e" 32 0.5 mm; material I=polyamide 66; melting point of the material I=255° C.; modulus of compression of material I: 320 daN/mm$_2$; the wires 10 are preheated before the production of the sheath 1 in known manner in order to cause good adherence between the wires 10 and the material I; secant modulus in extension of the material I, measured at 10% elongation and at 160° C: 250 MPa;

sheath 2, initial, before the production of the matrix 3: thickness "a" in solid state: 0.20 mm; material II=polyamide 6; melting point of material II=220° C.; modulus of compression of material II=290 daN/mm$^2$; secant modulus in extension of material II, measured at 10% elongation and at 160° C.: 250 MPa;

distance between adjacent wires 10: 1 mm (2e) in each layer and from one layer to the other;

width l of the ribs 14: 1 mm; depth "p" of the ribs 14 (FIG. 2): 0.5 mm;

the materials I and II have good adherence to each other, since they are both polyamides.

The geometrical values, the modulus of extension of the steel wires and the modulus of compression given previously for the bead rings 100 are determined at 20° C.

The sheaths 1 and 2 around the wires 10 are produced by double extrusion as described above. The bead ring 100 is produced as described previously in the device 20, the temperature of the material II in the tunnel 22 and in the gorge 24 being about 245° C.

It goes without saying that one could simultaneously wind several turns of sheathed wires 10C in the gorge 24, for instance by the simultaneous use of several bobbins 21. The method previously described for the production of the bead ring 100 is simple and rapid, and it furthermore has the advantage of permitting a large variety of forms of bead ring 100 by varying the shape of the gorge 24 in which the turns of the sheathed wires 10C are wound, this variation in shape possibly taking place upon the winding of the turns of sheathed wires 10C as described, for instance, in the aforementioned French Patent Application No. 85/00875. One can also effect continuously the double sheathing of the wire 10 with the materials I and II and the production of the bead ring 100 as described, for example, in the aforesaid French Patent Application No. 85/00875.

Figure 8:
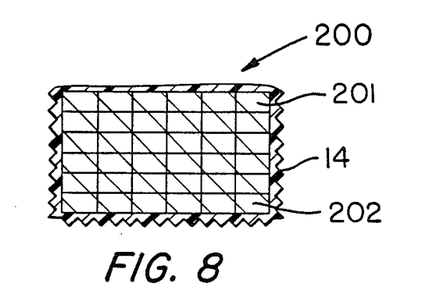
FIG. 8 shows, in cross section, another bead ring according to the invention.

The invention is not limited to the case in which the bead ring 100 comprises sheathed wires. FIG. 8 shows, for instance, in cross section, another bead ring 200 in accordance with the invention.

This bead ring 200 has an assembly 201 of reinforcement wires 202. This assembly 201 is of the so-called "package" type manufactured, for instance, by the method described in French Patent No. 2,456,610. This method consists essentially in imparting to the steel wire 202, prior to the winding thereof on the manufacturing form, a permanent deformation by means of a suitable deviated flexure, the assembly 201 being therefore formed of a stack of adjacent metal wires 202 of rectangular cross section wound layer on layer and wire to wire on a manufacturing form after permanent bending of the wires. In accordance with the invention, this bead ring 200 has on its surface ribs 14 made, for instance, of the same material as in the case of the bead ring 100, these ribs 14 being obtained, in particular, by the injection molding of this material on top of the assembly 201 which has been previously placed in the injection mold. This bead ring 200 is characterized by great rigidity.

Figure 9:
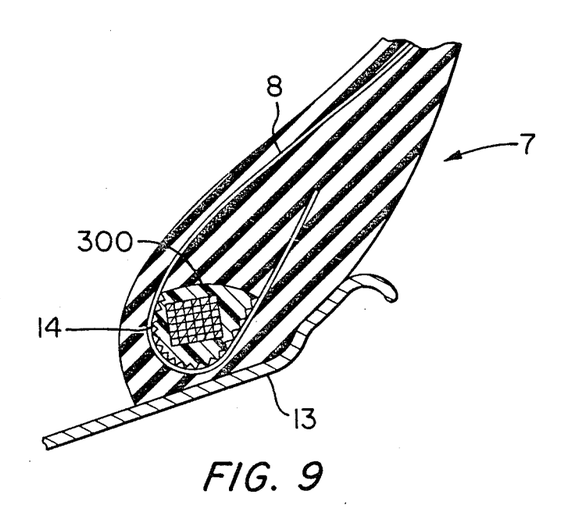
FIG. 9 shows, in radial section, a bead of a pneumatic tire having a different bead ring according to the invention. de

The invention is not limited to cases in which the bead rings are of generally polygonal cross section. FIG. 9 shows, for instance, in radial section, the bead 7 of a pneumatic tire, this bead 7 being reinforced by another bead ring 300 according to the invention which, in this cross section, has a generally curved shape in the portion where it is in contact with the carcass ply 8, in order to distribute uniformly the stresses of the carcass ply 8 over as large a bead ring surface as possible via the ribs 14. Such an arrangement is particularly advantageous in the case of pneumatic tires for heavy vehicles.

The ribs 14 are preferably continuous and arranged circumferentially, as previously described, but the invention covers the cases in which these ribs 14 are discontinuous and/or have a non-circumferential direction, these ribs 14 having possibly for instance a helical shape.

Of course, the invention is not limited to the embodiments described above.

What is claimed is:

1. A pneumatic tire comprising at least one bead, at least one carcass ply within said bead and a bead ring for reinforcing the bead, said carcass ply having a region which extends around the bead ring, said bead ring having a surface made of a material whose secant modulus in extension, measured at 10% elongation and at 160° C., is equal to at least 70 MPa, said surface having a plurality of sawtooth ribs having a width less than 3 mm, which ribs contact, either directly or via a thin layer of rubber having a thickness less than 1 mm, the carcass ply in the region where the carcass ply extends around the bead ring for anchoring the bead ring with the region of the carcass ply which extends around the bead ring.

2. A bead ring for reinforcing a bead of a pneumatic tire having at least one carcass ply which extends around the bead ring, said bead ring having a surface made of material whose secant modulus in extension, measured at 10% elongation and at 160° C., is equal to at least 70 MPa, said surface having a plurality of sawtooth ribs having a width less than 3 mm for contacting, either directly or via a thin layer of rubber having a thickness less than 1 mm, the carcass ply in the region where it extends around the bead ring for anchoring the bead ring with the carcass ply in the region in which the carcass ply extends around the bead ring when the bead ring is embedded within the bead.

3. A bead ring according to claim 2, wherein the material has a secant modulus in extension, measured at 10% elongations and at 160° C., equal to at least 200 MPa.

4. A bead ring according to claim 2, wherein the ribs are continuous.

5. A bead ring according to claim 2, wherein the ribs are circumferential.

6. A bead ring according to claim 2, wherein the bead ring has a rigidity such that it is necessary to apply to the bead ring a torque equal to at least 0.8 daNm, at room temperature, in order to cause a rotation of 1° of the bead ring radial section.

7. A bead ring according to claim 2, wherein the material is a thermoplastic material.

8. A bead ring according to claim 7, wherein the material is a polyamide.

9. A bead ring according to claim 2, wherein the bead ring comprises an assembly of reinforcement wires surrounded individually by a sheath, the sheaths of two adjacent wires being in contact with each other, and a matrix surrounding these sheathed wires.

10. A bead ring according to claim 9, wherein the ribs are formed by the matrix.

* * * * *

UNITED STATES PATENT AND TRADEMARK OFFICE
CERTIFICATE OF CORRECTION

PATENT NO. : 4,860,810
DATED : August 29, 1989
INVENTOR(S) : Jean-Charles Lacour It is certified that error appears in the above-identified patent and that said Letters Patent is hereby corrected as shown below:

First page, 4th line of ABSTRACT, "160°0C." should read --160°C--;

Col. 1, line 28, "1160°C" should read --160°C--;

Col. 1, line 41, "wtih at least one bear ring" should read --with at least one bead ring--;

Col. 2, line 5, delete "de" ;

Col. 4, line 34, "VI-I" should read --VI-VI--;

Col. 4, line 49, "assemlby" should read --assembly--;

Col. 4, line 56, "sheaths I" should read --sheaths 1--;

Col. 4, line 62, "the cool" should read --to cool--;

Col. 5, line 44, "thye" should read --the--;

UNITED STATES PATENT AND TRADEMARK OFFICE
CERTIFICATE OF CORRECTION

PATENT NO. : 4,860,810

DATED : August 29, 1989

INVENTOR(S) : Jean-Charles Lacour

It is certified that error appears in the above-identified patent and that said Letters Patent is hereby corrected as shown below:

Col. 6, line 41, "each wires" should read --each wire--;

Col. 6, line 45, "32 0.5 mm" should read -- = 0.5 mm--;

Col. 6, line 48, "$mm_2$" should read --$mm^2$--.

Signed and Sealed this

Eighteenth Day of February, 1992

*Attest:*

HARRY F. MANBECK, JR.

*Attesting Officer*     *Commissioner of Patents and Trademarks*